UNITED STATES PATENT OFFICE.

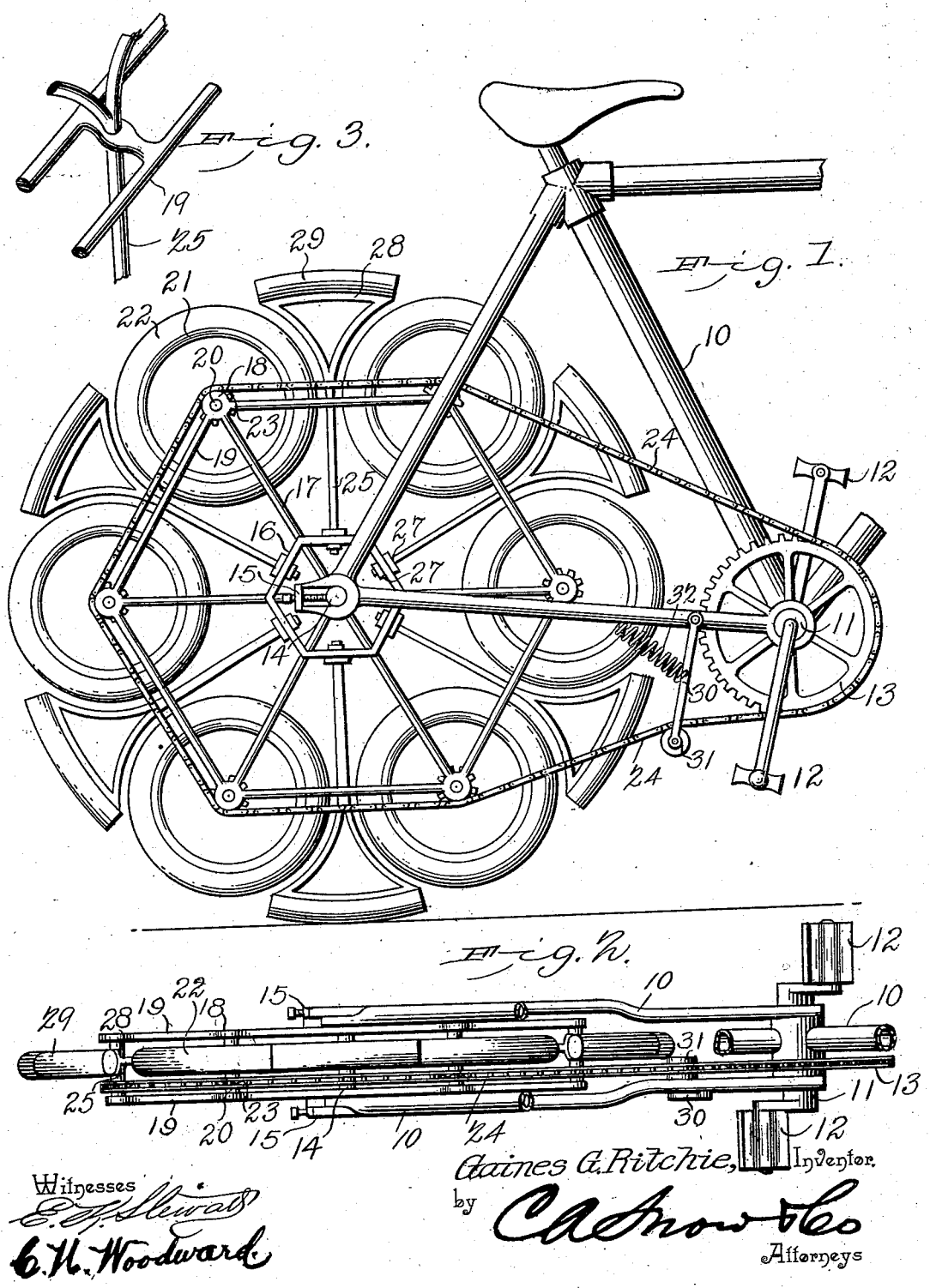

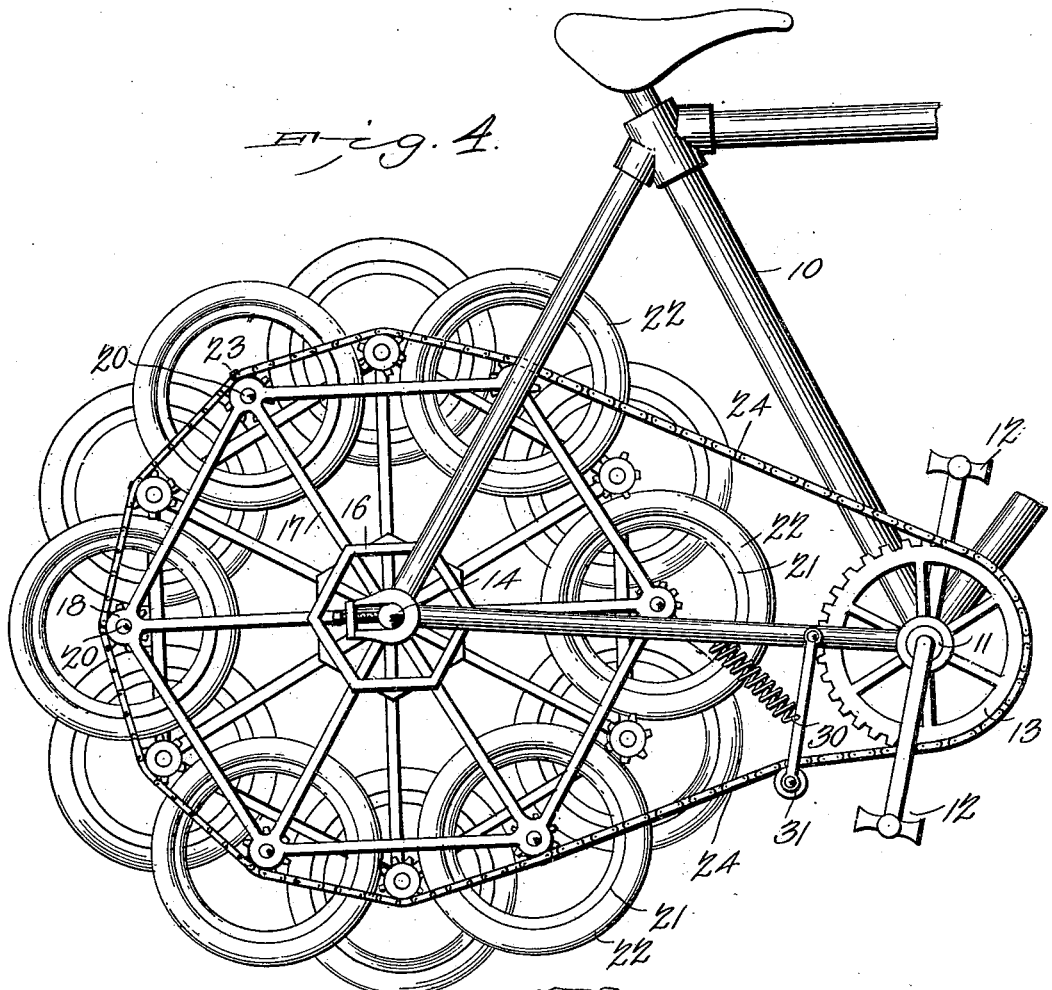

GAINES GREENE RITCHIE, OF SANGAMON, ILLINOIS.

BICYCLE-WHEEL.

SPECIFICATION forming part of Letters Patent No. 722,433, dated March 10, 1903.

Application filed October 22, 1902. Serial No. 128,329. (No model.)

*To all whom it may concern:*

Be it known that I, GAINES GREENE RITCHIE, a citizen of the United States, residing at Sangamon, in the county of Macon and State of Illinois, have invented a new and useful Bicycle-Wheel, of which the following is a specification.

This invention relates to the wheels of vehicles of the bicycle class, but may be employed upon other styles of vehicles, if preferred, and I do not, therefore, wish to be limited in the use of the improvement to any particular construction of vehicle and reserve the right to apply the invention in any locality or for any purpose for which it is adapted.

The object of the invention is to produce a wheel whereby the power and speed may be greatly increased; and the invention consists in a rotatively-disposed supporting-frame carrying a plurality of spaced wheels adapted to consecutively engage the ground as the frame rotates and the vehicle moves forward, the spaced wheels adapted to be simultaneously and rapidly revolved.

The invention further consists in a supporting-frame rotatively disposed and carrying a plurality of spaced wheels rotatively connected thereto and adapted to be simultaneously revolved and with alternating segmental supports between the wheels.

The invention further consists in certain novel features of construction, all as hereinafter shown and described, and specified in the claims.

In the drawings illustrative of the invention, Figure 1 is a side elevation of a portion of a bicycle-frame with one of the improved wheels connected thereto. Fig. 2 is a plan view of the parts shown in Fig. 1. Fig. 3 is perspective detail of a portion of the framework, illustrating its construction. Fig. 4 represents a view similar to that shown in Fig. 1, showing a modified form of wheel.

For the purpose of illustration the invention is shown applied to the frame of a bicycle and adapted to be employed as the driving-wheel of the same. The bicycle-frame is indicated at 10 and will be formed substantially of the usual shape, with such slight modifications as may be necessary to adapt the improved wheel thereto.

The usual pedal-shaft is indicated at 11, with the pedals 12 and the sprocket drive-wheel 13 fast thereon.

Journaled transversely in the framework 10, at the usual place where the driver-wheel shaft is located in an ordinary bicycle, is a shaft 14, having the usual tension mechanism 15. Attached to this shaft 14, between the members of the framework 10, are two supporting-frames for the wheel members, consisting of hub-frames 16, spaced apart upon the shaft and each provided with a plurality of radiating arms 17, terminating in journals 18 and connected by diagonal brace-bars 19, as shown in Fig. 1.

The hub members 16, the spoke member 17, and the brace members 19 will preferably be formed of metal tubing welded or brazed at the joints in substantially the same manner and of substantially the same material as the ordinary bicycle-frame, whereby the minimum of weight with the maximum of strength will be secured.

The frames, composed of the members 16 17 18 19, will be rotatively disposed upon or with the shaft 14 and may be composed of as many of the arms or spokes 17 and other parts as may be desired; but for the purpose of illustration a frame is shown consisting of six parts, with six of the journals 18 equidistant from the center of the shaft 14 and equidistant from each other.

Journaled in the bearings 18 are the shafts 20 of a plurality of wheels 21, each of the wheels preferably formed in the same manner as an ordinary bicycle-wheel, with the wire spokes and the pneumatic tires 22, the wheels being so proportioned as to fit between the rotating frames with their adjacent rims a short distance apart, as shown.

Each of the wheels 21 will be provided with a sprocket-pinion 23, over which an endless chain 24 runs consecutively from the sprocket-pinion 13, as shown.

Between each pair of the wheels 21 is disposed an arm 25, the inner ends of the arms passing through the hub members 16 and adjustably connected thereto and movably engaging the transverse brace members 19, whereby the rods 25 are firmly supported and adjustable radially of the axle 14. Any suitable means may be employed for adjusting the rods 25; but for the purpose of illustration clamp-nuts 27 are shown for this purpose.

The rods 25 extend beyond the brace members 19 and branch in opposite directions, preferably in curving lines concentric to the wheels 21, and terminating in segments 28, the latter provided with sections of pneumatic tire-like construction, the sectors 28 29 conforming to and corresponding with the outer rim of the wheel as a whole, and, together with the portions of the tires 22 which for the time being are outermost, form a substantially continuous tire concentric with the shaft 14, as shown in Fig. 1.

The sectors 28 29 will extend to points adjacent to the rims 22 of the wheels 21, so that the gaps in the general rim will be as small as possible.

The rods 25, together with the sectors 28, will be constructed, preferably, in the same manner as the ordinary bicycle-frames and will be suitably braced and supported from the brace members 19 and hub members 16 to enable them to withstand the severe strains to which they will be subjected. When thus constructed and mounted, when motion is imparted to the pedal-shaft by the rider in the ordinary manner the wheels 21 will be consecutively rotated rapidly by the motion of the chain 24, this action at the same time rotating the wheel-supporting frames upon the shaft 14. As the wheels 21 rotate with the supporting-frames upon the shaft 14 they are rapidly rotated independently upon their own axles 20, so that as the wheels are brought around into position approaching the ground they gather momentum and speed, and as they strike the ground consecutively and intermittently with the sectors 28 29 their rapid revolution causes them to engage the ground and move the bicycle forward very rapidly, the sectors 28 29 supporting the wheel and insuring steadiness of motion by "bridging" the gaps that would otherwise occur between the wheels. The sectors 28, being provided with the yieldable pneumatic sections 29, will yield sufficiently to enable the tires 22 to "bite" the ground with a sufficient grip to insure the proper traction, the action being thus the same as an ordinary bicycle-wheel, but with greatly-increased speed and power. The wheels 21 thus come into action consecutively, and only one is in positive engagement with the ground at one time, the remaining wheels moving around with the supporting-frame and gathering motion and momentum as they move concentric to the shaft 14 and engaging the ground, as above noted, with their accelerated speed and increased power and correspondingly increasing the power and speed of the bicycle. The arms 25, supporting the sectors 28 29, being adjustable radially of the supporting-frame, the sectors may be maintained in alinement concentrically to the shaft 14, and thus secure the proper uniform action relative to the supporting-frame and the wheels 21. Attached to the frame 10 at some suitable point is a hanger 30, carrying an idler 31, adapted to engage the chain 24 to secure the proper tension thereof, as shown in Fig. 1, the hanger having a tension-spring 32.

The tension-wheel may be located at any desired point in the circuit of the chain 24, but will preferably be located on the lower side, as shown.

The device may be employed with slight modifications in connection with automobiles and similar machines or any other suitable machinery to which it may be adapted and may be modified as circumstances require without departing from the principle of the invention or sacrificing any of its advantages.

The framework shown in the drawings represents an approved structure, but may be modified as circumstances may require, and I do not, therefore, wish to be limited to any specific construction of framework, and hereby retain the right to such modifications and alterations as may come within the scope of the claims.

Any number of the wheels 21 may be employed, and they may be of any desired size to adapt the device to the size of the vehicle to which it will be attached.

Under some circumstances the device could be employed as an ordinary traction-wheel by carrying the chain around the pinions and dispensing with the sprocket-wheel 13.

In Fig. 4 a modification in the structure is shown, consisting in arranging two sets of the smaller wheels and connecting rotating frames side by side, with the wheels of one frame alternating with those of the other, whereby the intermediate sections 28 29 are dispensed with and providing for a "live" wheel being upon the ground at all times, as will be obvious. This modification, however, would not be a departure from the principle of the invention, as the operation would be the same in both structures.

Having thus described the invention, what is claimed is—

1. A driving-wheel having a revoluble frame and a peripheral series of tread-wheels, and means for communicating driving power respectively to the tread-wheels.

2. A wheel for bicycles and the like consisting of a supporting-frame rotatably disposed, a plurality of spaced wheels rotatively mounted upon said frame in a series concentric with its axle and each provided with a sprocket-pinion, a chain engaging said pinions, and means for operating said chain whereby said supporting-frame is rotated and said wheels likewise independently rotated simultaneously, substantially as described.

3. A wheel for bicycles and the like consisting of a supporting-frame rotatably disposed, a plurality of spaced wheels rotatively mounted upon said frame in a series concentric with its axle, a plurality of spaced segments alternately disposed between said wheels and concentric to the axle of said frame, means for rotating said frame and segments, and means for simultaneously rotating said wheels, substantially as described.

4. A wheel for bicycles and the like consisting of a supporting-frame rotatively disposed, a plurality of spaced wheels rotatively mounted upon said frame concentric to its axle, a plurality of spaced segments alternately disposed between said wheels and concentric to the axle of said frame, means for radially adjusting said segments relative to said frame, means for rotating said frame and segments, and means for simultaneously rotating said wheels, substantially as described.

5. A wheel for bicycles and the like consisting of a supporting-frame formed of spaced arms radiating from spaced hub members mounted upon an axle and having journals upon the outer ends of said arms, diagonal brace members connecting said radial arms, a plurality of wheels rotatively mounted in said journals and each provided with a sprocket-pinion, and a chain engaging said pinions, whereby said wheels may be independently rotated simultaneously, substantially as described.

6. A wheel for bicycles and the like consisting of a supporting-frame formed of spaced arms radiating from spaced hub members mounted upon an axle and having journals upon the outer ends of said arms, diagonal brace members connecting said radial arms, a plurality of wheels rotatively mounted in said journals, rods movably engaging said diagonal brace members intermediately of said wheels and provided with rim-segments upon their outer ends concentric to the axle of said frame, means for rotating said frame and segments, and means for simultaneously rotating said wheels, substantially as described.

7. The combination of a bicycle-frame, the pedal-shaft, a sprocket-wheel carried by said shaft, a chain engaging said sprocket-wheel, and a drive-wheel consisting of a frame rotatively supported in said bicycle-frame and a plurality of spaced wheels rotatively mounted upon said rotating frame concentric to its axle and having sprocket-wheels adapted to be engaged by said chain and simultaneously rotated thereby, substantially as described.

8. A wheel for bicycles and the like, consisting of a supporting-frame formed of spaced arms radiating from spaced hub members mounted upon an axle and having journals upon the outer ends of said arms, diagonal brace members connecting said radial arms, a plurality of wheels rotatively mounted in said journals, rods movably engaging said diagonal brace members intermediately of said wheels and provided with rim-segments upon their outer ends concentric to the axle of said frame, means for longitudinally adjusting said rods, means for rotating said frame and segments, and means for simultaneously rotating said wheels, substantially as described.

9. A wheel for bicycles and the like consisting in a supporting-frame rotatively disposed, a plurality of spaced wheels rotatively mounted upon said frame concentric to its axle and provided with yieldable tires, means for rotating said frame, and means for simultaneously rotating said wheels, substantially as described.

10. A wheel for bicycles and the like consisting of a supporting-frame rotatively disposed, a plurality of spaced wheels rotatively mounted upon said frame concentric to its axle and provided with yieldable tires, a plurality of spaced yieldable segments alternately disposed between said wheels and concentric to the axle of said frame, means for rotating said frame and segments, and means for simultaneously rotating said wheels, substantially as described.

11. The combination of a bicycle-frame, the pedal-shaft, a sprocket-wheel carried by said shaft, a chain engaging said sprocket-wheel, a drive-wheel consisting of a frame rotatively supported in said bicycle-frame and having a plurality of spaced wheels rotatively mounted thereon concentric to its axle and with sprocket-wheels adapted to be engaged by said chain and simultaneously rotated thereby, and an idler-pinion movably supported and adapted to engage said chain, and means for adjusting said idler-pinion to regulate the tension of said chain, substantially as described.

In testimony that I claim the foregoing as my own I have hereto affixed my signature in the presence of two witnesses.

GAINES GREENE RITCHIE.

Witnesses:
WILLIAM KELLER,
WILLIAM NICKEY.